Jan. 11, 1955

L. H. FLORA 2,698,979

MOLDING CLIP OR FASTENER

Filed April 7, 1954

INVENTOR
LAURENCE H. FLORA

BY

ATTORNEY

United States Patent Office 2,698,979
Patented Jan. 11, 1955

2,698,979

MOLDING CLIP OR FASTENER

Laurence H. Flora, Cleveland, Ohio, assignor to Tinnerman Products, Inc., Cleveland, Ohio, a corporation of Ohio Application April 7, 1954, Serial No. 421,609

12 Claims. (Cl. 24—73)

This invention relates in general to clips or fasteners for securing moldings, trim strips, and the like, onto a supporting structure and deals, more particularly, with improvements in molding clips or fasteners of this character which are adapted for securing a molding of varying width, or for securing various sizes of moldings in different widths, and with a locked connection by which the molding is positively retained against loosening or removal from the molding clips in applied fastening position on a panel or other supporting structure.

In many instances, the construction of a molding clip or fastener is such that it is suitable for use only with a molding or trim strip of one width or size, and accordingly, a complete line of clips in different sizes must be provided for moldings of various widths or sizes. In the use of a molding clip or fastener suitable for securing various sizes of moldings in different widths considerable savings and important advantages are involved inasmuch as only a single set of dies is required for making the clips and there is no problem of stocking and cataloguing various sizes of clips. Moreover, manufacturing variations and inconsistencies frequently develop in the production of the moldings, particularly when made of plastic, such that the inner walls of the moldings are not always precise and uniform throughout their lengths. Consequently, in the use of molding clips or fasteners suitable only for a specific size of molding and which must fit precisely within the inner wall of the molding, there are usually several clips in an installation which are so loosely connected to the molding that the molding is not secured properly with complete effectiveness in the manner intended.

In a further relation, in the moldings provided on present day automobile bodies, cabinet structures, and the like, the moldings are usually designed for a streamlined effect by providing the same in a gradually increasing width along the length thereof. Accordingly, in these instances, it is highly desirable and advantageous, of course, to secure such a molding by a single size clip or fastener which is adaptable to any width of the molding along the length thereof.

In providing a molding clip having a variable size head for the purposes aforesaid, the clip is usually composed of normally expanded yieldable head members which are adapted to be contracted to a size suitable for proper connection to the particular width of the molding to be secured by the clip. However, after the fastener has been secured in final fastening position, this yieldable condition of the head members of the clip in movable relation toward each other frequently results in an unsatisfactory, faulty installation inasmuch as there is a tendency for the molding to spring loose and become disconnected from the yieldable head members of the clip as a result of a pronounced shock or vibration such as takes place in an automobile installation, for example.

It is, therefore, a primary object of this invention to provide an improved construction for a molding clip or fastener of this character in which the portion of the fastener to be attached to the molding, or the like, is provided by a pair of normally expanded head members or head portions which are yieldable toward each other transversely of the molding so as to be readily adjustable for connection to a molding of varying width or to different moldings of various widths, while otherwise adapted for effective, proper connection to moldings of a standard size in a manner to compensate for manufacturing variations and irregularities in the formation of the moldings, and with said clip, otherwise, including means on one or more shank portions for locking said yieldable head members or head portions against movement toward each other in the direction for loosening or removal from their adjusted connected relation with the molding.

A further object of the invention is to provide an improved molding clip or fastener, such as described, in which the clip includes elements on one or more shank portions thereof for engaging said yieldable head members or head portions of the clip to retain said head members against movement toward each other in the direction for loosening or removal from connected relation with the molding.

Another object of the invention is to provide a molding clip or fastener in accordance with the foregoing in which the head members or head portions of the clip are provided with locking means comprising one or more abutments in the form of teeth, or the like, which are engaged by detents in the form or tongues, or the like, on one or more shank portions of the clip when applied to fastening position in an opening in a panel or other supporting part.

Further objects and advantages of the invention, and other new and useful features in the construction, arrangement and general combination of elements and details of the improved molding clips or fasteners of the invention will be apparent as the following description proceeds with reference to the accompanying drawings, for purposes of illustration but not of limitation, in which like reference characters designate like parts throughout, and in which.

Figure 1:
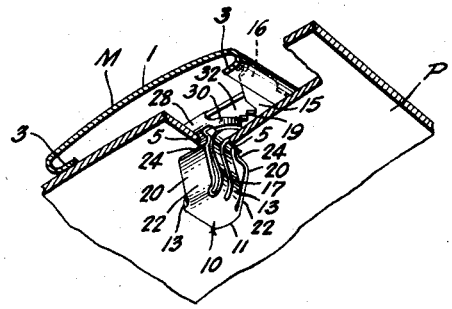
Fig. 1 is a fragmentary perspective view of a molding clip or fastener in accordance with the invention as connected to a molding and secured in a panel aperture to mount the molding on the panel.
Figure 2:
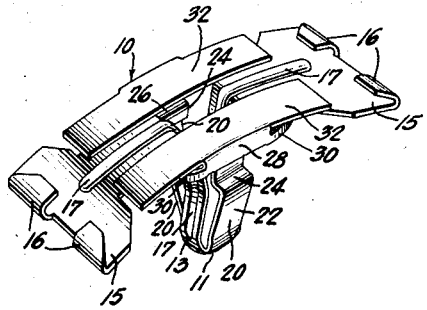
Fig. 2 is a perspective view of the improved molding clip or fastener of the invention as viewed from the upper side thereof.

The molding clips or fasteners of the invention are shown as used in connection with a molding M of a type employed in automobile body decorations wherein the molding comprises an elongate, hollow rolled strip of sheet metal which tapers in width along the length thereof. The top or crown 1 of the molding M is suitably decorative and the interior of said molding M is in the nature of a hollow channel-shaped wall having inturned flanges 3 along the longitudinal edges thereof.

A suitable number of molding clips or fasteners in accordance with the invention is attached to the molding at spaced points along the length thereof by connecting the head members or head portions of the clips to the inturned flanges 3 of the molding M with the shanks of the clips projecting from the underside of the molding in position to be secured in correspondingly spaced apertures 5 in the panel P or other supporting part along the path which the molding M extends in mounted position on said panel P.

The improved molding clip or fastener, designated generally 10, is provided from a blank of any suitable sheet metal preferably spring metal such as spring steel or cold rolled steel having spring-like characteristics. The blank has a generally cross-shaped formation defining an imperforate center portion 11 and two pairs of shank elements extending from said center portion 11 comprising a pair of arms 13 carrying the elements for connecting the clip to the molding M and a pair of legs 20 for securing the clip in the aperture 5 in the panel P or other support. Center portion 11 thus becomes the leading end of the shank of the fastener.

The pair of arms 13 each includes a neck portion and an enlarged plate-like head portion 15 extending outwardly therefrom and terminating in a return bent end 16 defining rounded bearing portions for snugly engaging the rounded corners of the inner wall of the molding adjacent the inturned flanges 3 thereof. The arms 13, otherwise, are bent intermediate their lengths inwardly toward each other to a spacing less than the size of the panel aperture 5 so as to readily pass therethrough without engaging the wall of said aperture 5 in any manner which would disturb the attachment of the head members 15 in connected relation with the inturned flanges 3 of the molding M. Preferably, each arm 13 and the adjoining head portion 15 are formed with a lengthwise corrugation 17 which strengthens and rigidifies said arm and head portions in operative relation to each other. The head portions 15 are slightly bowed or arched, and as best seen in Fig. 3, each head portion 15 is provided on its edges with a series of abutments in the form of locking teeth 19 or notches extending from adjacent the neck portions of arms 13 toward the outer ends of said head portions 15.

Figure 5:
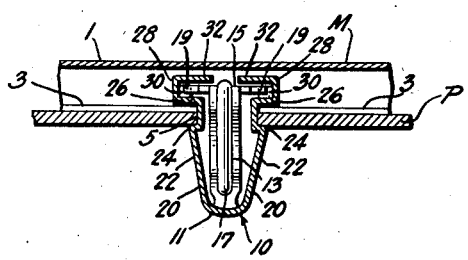

The legs 20 extend in slightly diverging relation from the center portion 11 defining the leading end or pilot portion of the fastener. The leading end 11 and adjoining portions of the legs 20 are of such size as to be readily received in the panel aperture 5 in the initial application of the clip. The legs 20, otherwise, extend in diverging relation to a spacing normally larger than the size of the panel aperture 5 and thereby define diverging guide surfaces 22 leading to shoulders 24 adapted for snap fastening engagement with marginal portions of the panel aperture 5, as seen in Fig. 5, to secure the clip in its fully attached fastening position. The shoulders 24 are shown provided by transverse depressions in said shank legs 20, but of course, similar shoulders may be formed in any other suitable manner to provide substantially the same fastening action.

Figure 3:
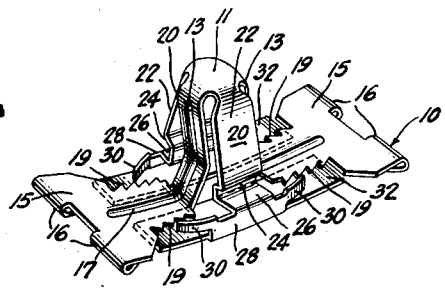
Fig. 3 is a perspective view of the molding clip or fastener as seen from the underside thereof.

The legs 20 include extensions beyond the shoulders 24 comprising web portions 26 bent outwardly in opposite directions substantially in a common plane with the head members 15, Fig. 3, and leading to outwardly return bent portions defining yokes 28 carrying laterally projecting locking tongues 30 adapted to engage the abutments or teeth 19 on the head portions 15 in any of several adjusted positions thereof. Preferably, the return bent yokes 28 are provided with elongate cap strips 32 which extend inwardly toward each other in overlying relation to the head portions 15. Said cap strips 32 have a slightly bowed or arched formation corresponding substantially to that of said head portions 15 and bridge the space between said head portions 15 to provide for rigidity in the overall head of the clip.

Figure 4:
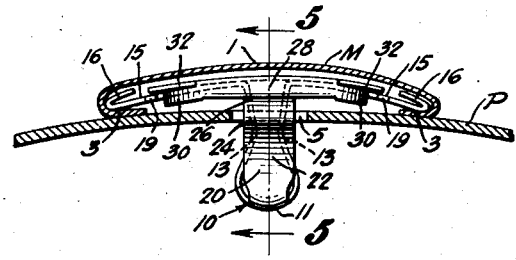
Fig. 4 is a sectional view showing a molding secured to an apertured panel by the improved molding clip or fastener; and, Fig. 5 is a vertical sectional view of Fig. 4 on line 5—5, looking in the direction of the arrows.

In attaching the clips 10 to the molding M, the head portions 15 of a clip are compressed toward each other as necessary to insert the same within the channel of the hollow molding M from an end thereof or from any other suitable point, into engagement with the inturned flanges 3 of the molding as seen in Fig. 4, whereupon the clip may be slid along the molding to the desired position in registry with the associated aperture 5 in the supporting panel P. The inherent resiliency of the arms 13 carrying the head portions 15 permits said head portions 15 to yield toward each other as necessary for the clip to slide within the molding in this manner, and such action is facilitated by the rounded end portions 16 thereof which slide readily in the rounded corners adjacent the inturned flanges 3 of the molding M.

From the foregoing, it will be understood that in the procedure for mounting a molding M on the panel P or other support, as many clips 10 as are necessary are attached to the molding, in the manner aforesaid, and in spaced relation corresponding to the spacing of the apertures 5 provided in the supporting panel P along the path which the molding extends in mounted position. The molding provided with the clips 10 attached thereto, is then ready for mounting onto the apertured supporting panel P. In such mounting operation, the leading end of each clip defined by the pilot portion 11 and adjoining portions of the arms 13 and legs 20 is readily entered into the associated panel aperture 5 inasmuch as the same is smaller than the size of said panel aperture 5, as aforesaid. Axial pressure is then applied to the top 1 of the molding M in the area of the head of each clip 10 to move the shank of the clip axially into the associated panel aperture 5, whereupon the diverging guide surfaces 22 of the shank legs 20 cam against the marginal edges of said panel aperture 5 to cause a gradual contraction of said shank legs 20 as necessary for the shoulders 24 thereon to pass through said aperture 5 and spring outwardly into locked positive engagement with the adjacent marginal portions thereof, substantially as shown in Fig. 5. In some instances, it is preferable to provide the shoulders 24 in the form of tapering abutments adapted to ride on the lower corner edges of the panel aperture 5 and thereby automatically seat in fastening engagement with such corner edges in the most effective manner even though the marginal portions of the aperture are not of uniform thickness or there is some slight irregularity therein.

In thus securing a clip 10 in fully attached position in the panel aperture 5, the initially expanded shank legs 20 are moved toward each other in compressed relation in the panel aperture 5. The yokes 28 carried by said shank legs 20, accordingly, have a corresponding movement inwardly toward each other such that the locking tongues 30 on said yokes 28 are forced into positive engagement with the abutments defined by the teeth or notches 19 on the head portions 15 in any adjusted position thereof depending on the width of the molding M engaged thereby. The locking tongues or detents 30 are thereby retained in locking engagement with the teeth or notches 19 on the head portions 15 in a manner which positively prevents movement of said head portions 15 inwardly toward each other in the direction for disconnection of said head portions 15 from the inturned flanges 3 of the molding M. The arrangement, accordingly, is such that when the shank legs 20 are secured by the shoulders 24 in positively locked relation in the panel aperture 5, there is simultaneously provided a positive lock on the head portions 15 in connected relation with the inturned flanges 3 of the molding M. Thus, in the secured position of a clip 10, the head portions 15 of the clip are locked in fixed and rigid relation to each other against movement inwardly toward each other in any way which would permit the inturned flanges 3 of the molding to disconnect from said head portions 15 of the clip under the most severe conditions of shock or vibration or the like, thereby insuring a strong, durable and permanent mounting of the molding M on the panel P.

The clip or fastener 10 preferably is constructed from relatively thin sheet metal the thickness of which is selected according to service requirements and the predetermined size of the parts of the assembly. The clip or fastener is most effective when provided of spring metal suitably tempered and otherwise treated to give the desired toughness and hardness, particularly in the case of devices intended for use in heavy duty applications. A cheap and highly satisfactory clip or fastener may be provided from cold rolled metal such as cold rolled steel which is untempered but of a spring metal nature and capable of providing an effective and reliable fastening device as and for the purposes described.

While the invention has been described in detail with a specific example, such example is intended as an illustration only inasmuch as the invention fully contemplates various modifications which may be provided without departing from the spirit and scope of the invention.

What is claimed is:

1. A fastener comprising a sheet metal device having a shank comprising a pair of arms and a leg integrally united at the leading end of the shank, said arms carrying head portions provided with abutments, and said leg carrying detents engageable with said abutments to retain said head portions in fixed relation to each other in the securing position of the fastener.

2. A fastener comprising a sheet metal device having a shank comprising a pair of arms and a pair of legs integrally united at the leading end of the shank, said arms carrying head portions provided with abutments, and said legs carrying detents engageable with said abutments to retain said head portions in fixed relation to each other in the securing position of the fastener.

3. A fastener comprising a sheet metal device having a shank comprising a pair of arms and a pair of legs integrally united at the leading end of the shank, said arms carrying head portions extending outwardly in opposite directions and provided with a series of abutments on each head portion, and at least one of said legs carrying a pair of detents, each of said detents being engageable with one abutment of said series of abutments on each head portion to retain said head portions in fixed relation to each other in the securing position of the fastener.

4. A fastener comprising a sheet metal device having a shank comprising a pair of arms and a pair of legs integrally united at the leading end of the shank, said arms carrying head portions extending outwardly in opposite directions and provided with a series of abutments on one side of each head portion, and one of said legs carrying a pair of detents each engageable with one abutment of said series of abutments on each head portion to retain said head portions in fixed relation to each other in the securing position of the fastener.

5. A fastener comprising a sheet metal device having a shank comprising a pair of arms and a pair of legs integrally united at the leading end of the shank, said arms carrying head portions extending outwardly in opposite directions and provided with a series of abutments on both sides of each head portion, and each of said legs carrying a pair of detents, each of said detents being engageable with one abutment of the series of abutments at one side of each head portion to retain said head portions in fixed relation to each other in the securing position of the fastener.

6. A fastener comprising a sheet metal device having a shank comprising a pair of arms and a pair of legs integrally united at the leading end of the shank, said arms carrying head portions extending outwardly in opposite directions and provided with a series of teeth on the edge of each head portion, and at least one of said legs carrying a pair of laterally extending tongues each engageable with one tooth of said series of teeth on each head portion to retain said head portions in fixed relation to each other in the securing position of the fastener.

7. A fastener comprising a sheet metal device having a shank comprising a pair of arms and a pair of legs integrally united at the leading end of the shank, said arms carrying head portions extending outwardly in opposite directions and provided with a series of teeth on both sides of each head portion, and each of said legs carrying a pair of laterally extending tongues, each of said tongues being engageable with one tooth of the series of teeth at one side of each head portion to retain said head portions in fixed relation to each other in the securing position of the fastener.

8. A fastener comprising a sheet metal device having a shank comprising a pair of arms and a pair of legs integrally united at the leading end of the shank, said arms carrying head portions extending outwardly in opposite directions and provided with a series of abutments at both sides of each head portion, each of said legs having an outwardly bent end portion defining a yoke carrying a pair of tongues extending laterally outwardly in opposite directions, and each of said tongues being engageable with one abutment of the series of abutments at one side of each head portion to retain said head portions in fixed relation to each other in the securing position of the fastener.

9. A fastener comprising a sheet metal device having a shank comprising a pair of arms and a pair of legs integrally united at the leading end of the shank, said arms carrying head portions extending outwardly in opposite directions and provided with a series of teeth on both side edges of each head portion, each of said legs having an outwardly bent end portion defining a yoke carrying a pair of tongues extending laterally outwardly in opposite directions, and each of said tongues being engageable with one tooth of the series of teeth on the edge of each head portion to retain said head portions in fixed relation to each other in the securing position of the fastener.

10. A fastener comprising a sheet metal device having a shank comprising a pair of arms and a pair of legs integrally united at the leading end of the shank, said arms carrying head portions extending outwardly in opposite directions and provided with a series of abutments on both sides of each head portion, each of said legs having a return bent end portion defining a yoke and an inwardly extending cap portion overlying said head portions, said yoke on each of said legs carrying a pair of tongues extending laterally outwardly in opposite directions, and each of said tongues being engageable with one abutment of the series of abutments at one side of each head portion to retain said head portions in fixed relation to each other in the securing position of the fastener.

11. A fastener comprising a sheet metal device having a shank comprising a pair of arms and a pair of legs integrally united at the leading end of the shank, said arms carrying head portions extending outwardly in opposite directions and provided with a series of teeth on both edges of each head portion, each of said legs having a return bent end portion defining a yoke and an inwardly extending cap portion overlying said head portions, said yoke on each of said legs carrying a pair of tongues extending laterally outwardly in opposite directions, and each of said tongues being engageable with one tooth of the series of teeth on the edges of each head portion to retain said head portions in fixed relation to each other in the securing position of the fastener.

12. A fastener comprising a sheet metal device having a shank comprising a pair of arms and a pair of legs integrally united at the leading end of the shank, said arms carrying head portions extending outwardly in opposite directions and provided with a series of teeth on both edges of each head portion, each of said legs including an outwardly directed web portion connected to a return bent end portion defining an inwardly extending cap portion overlying said head portions, the bight of said return bent portion on each of said legs carrying a pair of tongues extending laterally outwardly in opposite directions, and each of said tongues being engageable with one tooth of the series of teeth on the edges of each head portion to retain said head portions in fixed relation to each other in the securing position of the fastener.

References Cited in the file of this patent

UNITED STATES PATENTS

| | | |
|---|---|---|
| 2,300,478 | Wiley | Nov. 3, 1942 |
| 2,631,345 | Poupitch | Mar. 17, 1953 |